Dec. 8, 1925.
C. C. SPREEN
1,565,029
COMPRESSOR
Filed Aug. 9, 1923
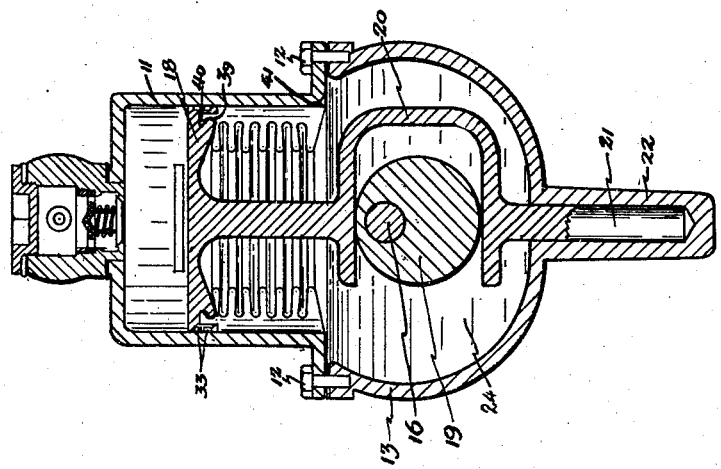
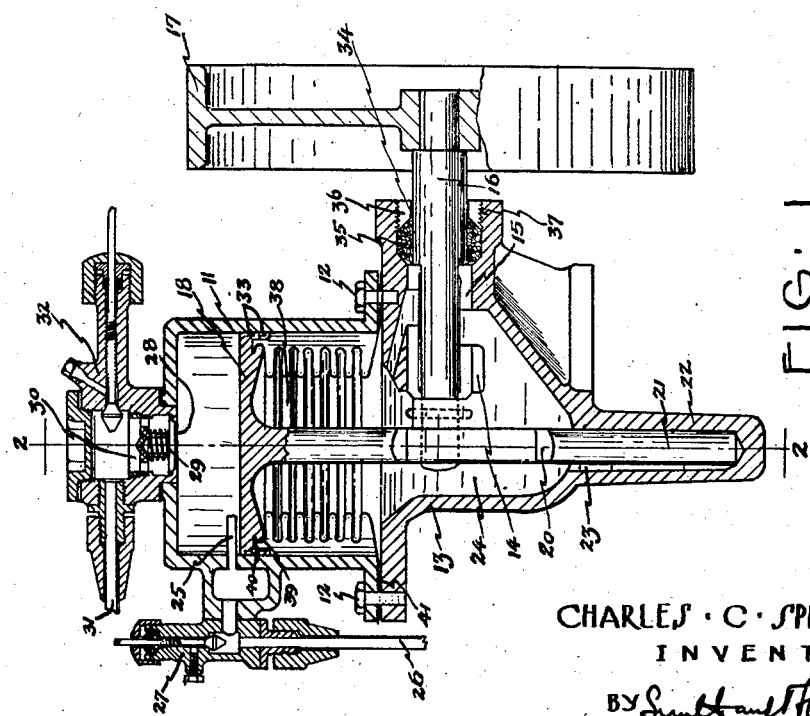
CHARLES · C · SPREEN
INVENTOR
BY
ATTORNEYS Patented Dec. 8, 1925.

1,565,029

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

COMPRESSOR.

Application filed August 9, 1293. Serial No. 656,611.

*To all whom it may concern:*

Be it known that I, CHARLES C. SPREEN, a citizen of the United States, residing at Detroit, in the county of Wayne and State of Michigan, have invented a certain new and useful Improvement in Compressors, of which the following is a full, clear, and exact description, reference being had to the accompanying drawings.

In the use of mechanical refrigeration for household purposes it is extremely desirable that the entire system be constructed to prevent the escape of refrigerant. Heretofore, particularly because of the difficulty in properly sealing the opening in the compressor through which the piston mechanism emerges, there has been provided, so far as I am aware, no compressor which was entirely satisfactory for the purpose. My invention provides a satisfactory seal for this opening and, by utilizing other satisfactory apparatus, provides a compressor completely sealed against escape of refrigerant. In the drawings accompanying this specification and forming a part thereof I have shown, for purposes of illustration, one form which my invention may assume. In these drawings:

Figure 1 is a longitudinal section through a compressor embodying my invention, while Figure 2 is a section on the line 2—2 of Figure 1.

The compressor herein shown comprises a cylinder 11 secured by means of a plurality of bolts 12 to a crank case 13 provided with suitable bearings 14 and 15 arranged to carry a drive shaft 16 which is driven by means of a pulley 17 secured to its exterior end and drives a piston 18 by means of an eccentric 19 secured to the inner end of the shaft 16 and operating within a yoke 20 secured at one end to the piston 18 and at the other end to a guide rod 21 which is reciprocable within a guide 22 carried by the crank case 13 and provided with an oil slot 23 adapted to permit the entrance into the guide 22 of the oil 24 carried within the crank case 13. The compressor cylinder 11 is provided with a suitable inlet port 25 connected to the inlet duct 26 through a suitable shut-off valve 27, and is provided with a suitable outlet port 28 opening through a non-return valve 29 into an outlet passage 30 which is connected to the outlet duct 31 through a suitable shut-off valve 32.

The piston 18 is herein shown as provided with suitable rings 33 adapted to minimize leakage between the piston 18 and the wall of the cylinder 11. In actual practice, however, with the refrigerants used, it is found that such rings are not effective to entirely prevent leakage and that the refrigerant will work by such rings and emerge from the compressor through the opening 34 through which the shaft 16 enters even though this opening be substantially closed by packing 35 secured in position by means of a suitable ring 36 shown as screw-threaded at 37 to the crank case 13. Accordingly, I provide additional means to prevent the escape of refrigerant from the compression chamber and illustrate herein one means which I have found satisfactory for the purpose.

The means herein shown comprises a bellows 38 in the general form of a cylinder and having one edge 39 sealed within a groove 40 in the piston 18 and the other edge 41 securely clamped by means of the bolts 12 between the cylinder 11 and the crank case 13.

It will be readily apparent to those skilled in the art that in the compressor herein shown I have utilized throughout apparatus offering the minimum possibility of escape of the refrigerant and that in addition, by the use of the bellows 13, I have eliminated practically the only remaining path of escape of the refrigerant. It will therefore be apparent to those skilled in the art that the construction herein shown practically prevents the escape of refrigerant from the compressor and therefore accomplishes the primary object of my invention. Those skilled in the art, however, will readily realize that the construction herein shown may be variously modified without sacrificing the advantages of my invention or departing from the spirit thereof and that the disclosure herein is therefore illustrative only and my invention not limited thereto.

I claim:

1. In a compressor, a cylinder, piston mechanism comprising a piston head engaging and operating within said cylinder and operating means extending from said cylinder, and a member sealed at one edge to said cylinder and at the other edge to said piston mechanism and thus effective to hermetically seal the opening in said cylinder through which said mechanism extends, said cylinder being provided with an inlet port arranged to be uncovered by said head when said head is in advanced position to thus place said port at that time in communication with the space enclosed between said cylinder and said member.

2. In a compressor, a cylinder, piston mechanism comprising a piston head engaging and operating within said cylinder and operating means extending from said cylinder, and means hermetically sealing the opening in said cylinder through which said mechanism extends, said cylinder being provided with an inlet port arranged to be uncovered by said head when said head is in advanced position to thus place said port at that time in communication with the space enclosed between said cylinder and said means.

In testimony whereof, I hereunto affix my signature.

CHARLES C. SPREEN.